United States Patent
Dossey (10) Patent No.: US 11,337,451 B2
(45) Date of Patent: May 24, 2022

(54) INSECT PRODUCTS AND METHODS OF MANUFACTURE AND USE THEREOF

(71) Applicant: Aaron T. Dossey, Midwest City, OK (US)

(72) Inventor: Aaron T. Dossey, Midwest City, OK (US)

(*) Notice: Subject to any disclaimer, the term of this patent is extended or adjusted under 35 U.S.C. 154(b) by 1060 days.

(21) Appl. No.: 14/537,960

(22) Filed: Nov. 11, 2014

(65) Prior Publication Data
US 2015/0132433 A1 May 14, 2015

Related U.S. Application Data

(60) Provisional application No. 61/902,346, filed on Nov. 11, 2013.

(51) Int. Cl.
*A23L 35/00* (2016.01)
*A23J 3/22* (2006.01)
(Continued)

(52) U.S. Cl.
CPC ............ *A23L 35/00* (2016.08); *A23J 3/227* (2013.01); *A23K 10/00* (2016.05); *A23L 3/00* (2013.01);
(Continued)

(58) Field of Classification Search
CPC .. A23L 1/317; A23L 3/00; A23J 3/227; A23V 2002/00
See application file for complete search history.

(56) References Cited

U.S. PATENT DOCUMENTS 6,156,330 A * 12/2000 Tsukada ................ A01N 25/10
424/405
2003/0170887 A1 9/2003 Imanishi et al.
(Continued)

FOREIGN PATENT DOCUMENTS

CN 1145227 A 3/1997
CN 1231131 A 10/1999
(Continued)

OTHER PUBLICATIONS

"Edible Insects Future Prospects for Food and Feed Security". Avilalbe online at http://www.fao.org/docrep/018/i3253e/i3253e00.htm on Mar. 13, 2013 (Year: 2013).*
(Continued)

*Primary Examiner* — Erik Kashnikow
*Assistant Examiner* — Assaf Zilbering
(74) *Attorney, Agent, or Firm* — Sterne, Kessler, Goldstein & Fox P.L.L.C.

(57) ABSTRACT

Methods for producing insect product are provided that include wet-grinding at least one whole insect into an insect slurry and drying the insect slurry to form a dried insect product comprising solid insect matter particles. Methods for producing a chitin product are also provided that include wet-grinding at least one whole insect into an insect slurry and removing chitin from at least a portion of the insect slurry. Insect products are also provided that include a composition derived from at least one whole insect and has solid insect matter particles, in which the composition has a peroxide value of about 30 meq/kg of fat or less and about 90% of the solid insect matter particles, by volume, has a particle size of about 1000 μm or less.

30 Claims, 3 Drawing Sheets

(51) Int. Cl.
    *A23L 3/00* (2006.01)
    *A23L 3/40* (2006.01)
    *A23K 10/00* (2016.01)
    *A23L 29/275* (2016.01)
(52) U.S. Cl.
    CPC ............... *A23L 3/40* (2013.01); *A23L 29/275* (2016.08); *A23V 2002/00* (2013.01)

(56) References Cited

U.S. PATENT DOCUMENTS

| | | | | |
|---|---|---|---|---|
| 2008/0075818 | A1* | 3/2008 | Papadoyianis | A23K 50/80 426/416 |
| 2012/0148712 | A1 | 6/2012 | Guilfoyle et al. | |

FOREIGN PATENT DOCUMENTS

| | | | |
|---|---|---|---|
| CN | 1325632 | A * | 12/2001 |
| CN | 1415757 | A | 5/2003 |
| CN | 1452902 | A | 11/2003 |
| CN | 101116471 | A | 2/2008 |
| CN | 101406295 | A * | 4/2009 |
| EP | 0913407 | A | 5/1999 |
| GB | 2177588 | A | 1/1987 |
| JP | 2004-033203 | A | 2/2004 |
| JP | 2009254348 | A | 11/2009 |
| KR | 1020050050204 | A | 5/2005 |
| WO | 2010096107 | A1 | 8/2010 |

OTHER PUBLICATIONS

Ramos-Elorduy, Julieta, "Anthropo-entomophagy: Cultures, evolution and sustainability", Entomological Research 39, 2009, pp. 271-288.
Bondari, K. et al., "Solider Fly Larvae as Feed In Commercial Fish Production", Aquaculture, 24, 1981, pp. 103-109.
http://www.newhope360.com, "A Strategic Look at Protein", Oct. 24, 2013.
Nakagaki, B. et al., "Comparison of Diets for Mass-Rearing Acheta domesticus (Orthoptera: Gryllidae) as a Novelty Food, and Comparison of Food Conversion Efficiency with Values Reported for Livestock", Entomological Society of America 1991, pp. 891-896.
Dossey, Aaron T., "Insects and their chemical weaponry: New potential for drug discovery", Nat. Prod. Rep., 27, 2010, pp. 1737-1757.
Defoliart, Gene R., "Edible insects as minilivestock", Biodiversity and Conservation 4, 1995, pp. 306-321.
Premalatha, M. et al., "Energy-efficient food production to reduce global warming and ecodegradation: The use of edible insects", Renewable and Sustainable Energy Reviews 15, 2011, pp. 4357-4360.
Yen, Alan L., "Entomophagy and insect conservation: some thoughts for digestion", J. Insect Conserv. 13, 2009, pp. 667-670.
Nonaka, Kenichi, "Feasting on insects", Entomological Research 39, 2009, pp. 304-312.
Mass Production of Beneficial Organisms Invertebrates and Entomopathogens, Elsevier, Nov. 13, 2013, Chapter 18, p. 617-652.
Weissman, David B. et al., "Billions and billions sold: Pet-feeder crickets (Orthoptera: Gryllidae), commercial cricket farms, an epizootic densovirus, and government regulations make for a potential disaster", Zootaxa, 3504, 2012, pp. 67-88.
Van Huis, Arnold, "Potential of Insects as Food and Feed in Assuring Food Security", Annu. Rev. Entomol. 58, 2013, pp. 563-583.
Ramos-Elorduy, Julieta, "Nutritional Value of Edible Insects from the State of Oaxaca, Mexico", Journal of Food Composition and Analysis, 10, 1997, pp. 142-157.
Dossey, Aaron, "Why Insects Should Be in Your Diet", The Scientist Magazine, Feb. 1, 2013.
Srivastava, SK, "Traditional insect bioprospecting—As human food and medicine", Indian Journal of Traditional Knowledge, vol. 8(4), 2009, pp. 485-494.
Bukkens, Sandra G.F., "Insects in the Human Diet: Nutritional Aspects", Ecological Implications of Minilivestock, pp. 545-577.
Bukkens, Sandra G.F., "The Nutritional Value of Edible Insects", Ecology of Food and Nutrition, vol. 36, 1997, pp. 287-319.
DeFoliart, Gene, "Insects as human food", Crop Protection, vol. 11, 1992, pp. 395-399.
Gahukar, R.T., "Entomophagy and human food security", International Journal of Tropical Insect Science, vol. 31, No. 3, 2011, pp. 129-144.
Finke, Mark D., "Estimate of Chitin in Raw Whole Insects", Zoo Biology 26, 2007, pp. 105-115.
International Search Report and Written Opinion of the International Searching Authority, PCT/US2014/064920, dated Feb. 19, 2015.

* cited by examiner

INSECT PRODUCTS AND METHODS OF MANUFACTURE AND USE THEREOF

CROSS-REFERENCE TO RELATED APPLICATIONS

This application claims priority to U.S. Provisional Application No. 61/902,346, filed Nov. 11, 2013, which is incorporated herein by reference.

TECHNICAL FIELD

The present disclosure is generally in the field of insects, and more particularly insect products which, for example, may be used as substitutes or supplements for human food or animal feed.

BACKGROUND

As the human population grows, it is ever more important to sustain rather than increase levels of human consumption and harvesting materials from the planet and its ecosphere. The world adds about 70 million people each year. The United Nations expects the population to grow by 2050 to more than 9 billion people, adding approximately twice the current population of China. Humans consume roughly 40% of the biomass that the land and the coastal seas produce. Approximately 70% of agricultural land, and 30% of the total land on earth, is used to raise livestock. Expanding the amount of land used for livestock production is neither a feasible nor a sustainable solution to cover the food and/or protein needs of the projected increases in population. Thus, it is important to use sources of high quality animal protein which reduce the amount of pollution, habitat destruction, and abuse of natural resources.

Insects have been found to be a promising source of high quality animal protein with a substantially lower ecological footprint than vertebrate livestock. Insects possess a number of attractive features over vertebrate livestock including, for example: 1) high feed conversion ratio (efficiency of converting feed into edible animal body mass); 2) higher reproductive rates; 3) less land use; 4) lower energy consumption; 5) less water use; and 6) producing lower levels of greenhouse gases. Additionally, because many insects can obtain water directly from food, along with the aforementioned feed conversion efficiency, production of insects involves substantially less water usage than livestock. Lower water usage reduces the energy needed to pump or recycle more clean water for crops and livestock. Increased utilization of insects in food or feed products rather than ingredients from vertebrae livestock can significantly reduce the human contribution to environmental destruction such as climate change.

Even though a portion of the human population may eat insects on a regular basis, there has not yet been any focused effort to maximize their utility as human food or animal feed. Over the next 40 years, rapid population growth, increased demand for meat, protein, climate change, the ecological impact of vertebrate livestock, and competition for land, water, and fuel all threaten global stability. Land and resources for production of high quality protein food such as beef is becoming scarce. The United Nations Food and Agriculture Organization (FAO) estimates there are at least 1,400 species of edible insects currently known in the world. In fact, utilizing insects as a food and feed source can directly address several goals of the United Nations Millennium Development Goals including, eradicating extreme poverty and hunger, reducing child mortality rates, and ensuring environmental sustainability.

Insects possess a number of features which make them attractive targets for exploration as a more sustainable agricultural product (e.g., food or feed ingredient), such as: 1) being highly prolific with short life spans; 2) producing a high yield of complete protein, fat and micro-nutrients compared to vertebrate livestock; 3) being very efficient at biotransformation of organic matter into edible insect mass; and 4) not consuming products that compete with the human food supply. Thus, insects present a substantial, yet extremely underexplored, alternative opportunity to provide much needed animal-sourced nutrients. Plus, insect-based food products may have a longer shelf-life, which is important for the transportation and storage of food in some remote areas where malnutrition is common.

While wild harvested insects are eaten by many people, utilizing farmed and processed insects will be substantially more effective, efficient, and safer from pathogens and pesticide contamination. Additionally, data on nutrient content varies widely by species, so using homogenous farmed stock of individual species provides much greater product quality control. Current methods for preparing insects for food include roasting whole insects and then grinding them into an "insect flour." These methods are inefficient, costly, and may destroy valuable nutrients and reduce shelf life and overall product quality. The use of insects as a major human food or animal feed source presents two important technological challenges: 1) how to turn insects into safe, healthy and tasty food products; and 2) how to cheaply, efficiently, and sustainably produce enough insects to meet market demand. Therefore, insect products that are safe, nutritious, and high quality and efficient methods capable of producing such insect products are needed.

SUMMARY

In one aspect a method for producing insect product is provided. In one embodiment, the method includes wet-grinding at least one whole unwashed insect, at least one whole adult insect, or at least one whole live insect into an insect slurry and drying the insect slurry to form a dried insect product comprising solid insect matter particles. In another embodiment, the method includes wet-grinding at least one whole insect into an insect slurry and drying the insect slurry to form a dried insect product comprising solid insect matter particles, in which drying comprises spray drying or drum drying.

In another aspect, a method for producing a chitin product is provided. The method includes wet-grinding at least one whole insect into an insect slurry and removing chitin from at least a portion of the insect slurry.

In yet another aspect, an insect product is provided. The insect product includes a composition derived from at least one whole insect and includes solid insect matter particles. The composition has a peroxide value of about 30 meq/kg of fat or less and about 90% of the solid insect matter particles, by volume, has a particle size of about 1000 μm or less.

DETAILED DESCRIPTION

The present teachings are directed to insect products that are derived from at least one whole insect. These insect products are nutritious and of higher-quality, compared to known insect products. Also provided herein are methods for producing these insect products. Parameters of different steps, components, and features of the embodiments are described separately, but may be combined consistently with this description and claims to enable other embodiments as will be understood by those skilled in the art.

Insect Product

In embodiments, the insect products comprise a composition that is derived from at least one whole insect and comprises solid insect matter particles. As used herein, the term "whole insect" is defined as a non-dewatered insect of any life stage that is live, or euthanized, or preserved. As used herein, the term "non-dewatered" is defined as non-predried. In some embodiments, the whole insect is a whole unwashed insect, in which the term "unwashed" is defined as non-washed or non-cleansed. In some embodiments, the whole insect is a whole adult insect, in which the term "adult" is defined as any life stage of an insect, including nymph, except for egg, larva, or pupa.

The insects may include arthropods and/or invertebrates. Non-limiting examples of suitable insects include: superworms (*Zophobas morio*); crickets (House Cricket (*Acheta domesticus*) and Banded Cricket (*Gryllodes sigillatus*)); mealworms (*Tenebrio molitor*); Caribbean fruit fly (*Anastrepha suspensa*); black soldier fly (*Hermetia illucens*); grasshoppers or locusts or katydids (Differential grasshopper (*Melanoplus differentialis*), Migratory grasshopper (*Melanoplus sanguinipes*), Chapulines Grasshopper (*Sphenarium purpurascens*), Desert Locust (*Schistocerca gregaria*), and Nsenene Katydid (*Ruspolia baileyi*)); and Silkworms or caterpillars (*Bombyx mori*).

As used herein, "solid insect matter particles" means solid particles of comminuted whole insects.

In one embodiment, the composition has a peroxide value of about 30 meq/kg of fat or less. In other embodiments, the composition has a peroxide value of about 20 meq/kg of fat or less, 10 meq/kg of fat or less, or 5 meq/kg of fat or less. In another embodiment, the composition has a peroxide value of about 1 meq/kg of fat or less. In yet another embodiment, the composition has a peroxide value from about 0.01 meq/kg of fat to about 30 meq/kg of fat. In a further embodiment, the composition has a peroxide value from about 0.01 meq/kg of fat to about 1.0 meq/kg of fat. The peroxide value is a precursor to rancidity of a composition. The peroxide value is the most commonly used assay for measuring the state of oxidation in fats and oils and its value measures the oxidative rancidity or degree of oxidation of the fat/oil, not its stability. For determining peroxide value, the AOCS Official Method CD-8-53 was used as a guideline. See Table 1 below.

In some embodiments, about 90% of the solid insect matter particles, by volume, has a particle size of about 1000 µm or less. In another embodiment, about 90% of the solid insect matter particles, by volume, has a particle size of about 100 µm or less.

In some embodiments, about 50% of the solid insect matter particles, by volume, has a particle size of about 200 µm or less. In another embodiment, about 50% of the solid insect matter particles, by volume, has a particle size of about 20 µm or less.

In one embodiment, about 90% of the solid insect matter particles, by volume, has a particle size of about 1000 µm or less and about 50% of the solid insect matter particles, by volume, has a particle size of about 200 µm or less. In another embodiment, about 90% of the solid insect matter particles, by volume, has a particle size of about 100 µm or less and about 50% of the solid insect matter particles by volume, has a particle size of about 20 µm or less.

In some embodiments, the composition has a L (lightness) value of at least 40 as measured on the Hunter L, a, b color scale. The Hunter L, a, b color scale views color in a similar manner to which the human eye sees color, with L measuring light to dark color components, and the "a" and "b" values are termed the opponent color axes. More specifically, L (lightness) is valued from 0 (black) to 100 (white); a opponent color axis (red-green) is valued from positive values (red) to negative values (green), 0 is neutral; and b opponent color axis (yellow-blue) is valued from positive values (yellow) to negative values (blue). On the Hunter scale, the key color parameter for the present disclosure is the L value. In general, the "L" scale values are units of light reflectance measurement, and the higher the value is, the lighter the color is since a lighter colored material reflects more light. In one embodiment, the composition has a L value of at least 40. In another embodiment, the composition has a L value of at least 70. In other embodiments, L ranges from about 70 to about 100, from about 75 to about 100, from about 80 to about 100, from about 85 to about 100, from about 90 to about 100, or from about 95 to about 100.

In some embodiments, the composition comprises protein in an amount of about 50% or more by weight based on dry weight of the composition. In certain embodiments, the composition comprises protein in an amount of about 25% or more by weight based on dry weight of the composition. In determining protein content, the test method AOAC Official Method 992.15 and the test method AACC Official Method 46-30 were used as a guideline. See Table 1 below.

In some embodiments, the composition comprises fat in an amount of less than about 20% by weight based on the dry weight of the composition. In another embodiment, the composition comprises fat in an amount of less than about 50% by weight based on the dry weight of the composition. In yet another embodiment, the composition comprises fat in an amount from about 0.1% to about 20% by weight based on the dry weight of the composition. In one embodiment, the composition comprises fat in an amount from about 0.1% to about 50% by weight based on the dry weight of the composition. In determining fat content, the test method AOAC Official Method 996.06 was used as a guideline.

In some embodiments, the composition has a water activity of about 0.5 aw or less. In one embodiment, the composition has a water activity of about 0.4 aw or less. In another embodiment, the composition has a water activity of about 0.3 or less. In yet another embodiment, the composition has a water activity of about 0.03 aw or less. In a further embodiment, the composition has a water activity from about 0.01 aw to about 0.5 aw. For determining water activity, the AOAC Official Method 978.18 was used as a guideline. See Table 1 below.

In some embodiments, the composition has an average surface oil of about 20% or less. In one embodiment, the composition has an average surface oil of about 17% or less. In another embodiment, the composition has an average surface oil of about 15% or less. In yet another embodiment, the composition has an average surface oil of about 10% or less. In a further embodiment, the composition has an average surface oil from about 0.01% to about 20%. The average surface oil content, as used herein, is determined by the surface oil analysis described below. See Example 9.

In embodiments in which at least a portion of chitin is removed from the composition, the insect product comprises reduced chitin. In one embodiment, the composition comprises chitin in an amount of less than about 20% by weight based on the dry weight of the composition. In another embodiment, the composition comprises chitin in an amount of less than about 10% by weight based on the dry weight of the composition. In yet another embodiment, the composition comprises chitin in an amount from about 0.01% to about 20% by weight based on the dry weight of the composition. Chitin is considered a component of the exoskeleton parts of insects. It does not dissolve readily in water or other solvents. Removing chitin is useful for insect products where low fiber is desirable, for example, texture, flavor, color, processing efficiency, or dietary or nutritional purposes. Chitin by itself has multiple applications in food, agriculture, medicine and materials.

In some embodiments, the composition comprises dietary fiber in an amount of less than about 10% by weight based on the dry weight of the composition. In one embodiment, the composition comprises dietary fiber in an amount of less than about 5% by weight based on the dry weight of the composition. In another embodiment, the composition comprises dietary fiber in an amount from about 0.01% to about 10% by weight based on the dry weight of the composition. In yet another embodiment, the composition comprises dietary fiber in an amount from about 0.01% to about 5% by weight based on the dry weight of the composition.

In some embodiments, about 90% of the solid insect matter particles, by volume, has a particle size of about 1000 μm or less or about 100 μm or less; about 50% of the solid insect matter particles, by volume, has a particle size of about 200 μm or less or about 20 μm or less. In such embodiments, the composition may have a peroxide value of about 30 meq/kg of fat or less or 1 meq/kg of fat or less; a L color value of at least 40 or at least 70 as measured on the Hunter L, a, b color scale; protein in an amount of about 50% or more by weight of the composition and fat in an amount of less than about 20% by weight based on dry weight of the composition; a water activity of about 0.5 aw or less; an average surface oil of about 20% or less; chitin in an amount of less than about 20% or less than about 10% by weight based on the dry weight of the composition; dietary fiber in an amount of less than about 10% or less than about 5% by weight based on dry weight of the composition; or combinations thereof.

The insect products as described herein may be used in a wide variety of products, including but not limited to: food products, such as meat alternatives, meat filler, protein bars, snack foods, pastas, or protein powder for shakes or beverages, candies, ice cream, cheese, dairy substitutes, breads and baked goods; Ready to Use Therapeutic Food ("RUTF"); Ready to Use Supplementary Food ("RUSF"); animal feed and pellets; nutraceutical ingredients, such as omega fatty acids, vitamins, minerals, and enzymes; and pharmaceuticals such as antibiotics. In one embodiment, the insect product is mixed with at least one of, but not limited to, the following ingredients: flavors, coloring, seasonings, oil, fat, spices, nutrients or vitamin supplements.

Insect Product Manufacture

In one embodiment, the method for making insect products described herein includes wet-grinding at least one whole unwashed insect, at least one whole adult insect, or at least one whole live insect into an insect slurry; and drying the insect slurry to form a dried insect product comprising solid insect matter particles. In another embodiment, the method for making insect products described herein includes wet-grinding at least one whole insect into an insect slurry and drying the insect slurry to form a dried insect product comprising solid insect matter particles, in which drying includes spray drying or drum drying. As used herein, "insect slurry" is a semiliquid mixture of ground non-dewatered insects with or without added liquid. In one embodiment, the semiliquid mixture includes a pre-determined ratio of insects (mass) to added liquid (mass), such as water. For example, an insect slurry includes a 1:2 weight ratio of insects to water (e.g., 200 pounds (approx. 90.7 kg) of insects and 400 pounds (approx. 181.4 kg) of water). In another embodiment, an insect slurry includes a 1:1 weight ratio of insects to water. In yet another embodiment, an insect slurry includes a range of 1:4 to 4:1 weight ratio of insects to water.

In one embodiment, the step of drying includes heat drying, spray drying, freeze drying, tray drying, air drying, vacuum drying, drum drying, or a combination thereof. Dryers, such as ovens, impingement ovens, freeze dryers, heat dryers, or hot air or vacuum dryers may be used. In another embodiment, spray drying is used to dry the insect slurry into a dried insect product. In yet another embodiment, drum drying is used to dry the insect slurry into a dried insect product. As used herein, "dried insect product" refers to an insect product (e.g., powder, flakes, meal) comprising water in an amount of about 15% by weight or less of the dried insect product. For example, in one embodiment, the dried insect product comprises water in an amount of less than about 10% by weight. In another embodiment, the dried insect product comprises water in an amount of less than about 5.0% by weight of the dried insect product. In yet another embodiment, the dried insect product comprises water in amount from less than about 3.0% by weight of the dried insect product. In a further embodiment, the dried insect product comprises water in amount from less than about 2.0% by weight of the dried insect product. In another embodiment, the dried insect product comprises water in an amount from about 0.01% to about 15% by weight of the dried composition. In yet another embodiment, the dried insect product comprises water in an amount from about 0.01% to about 5% by weight of the dried composition. In a further embodiment, the dried insect product comprises water in an amount from about 0.0% to about 15% by weight of the dried composition.

In some embodiments, the solid insect matter particles present in the dried insect product are in amount from about 85% to about 100% by weight of the dried insect product. In another embodiment, the solid insect matter particles present in the dried insect product are in amount from about 85% to about 95% by weight of the dried insect product. In yet another embodiment, the solid insect matter particles present in the dried insect product are in amount from about 85% to about 90% by weight of the dried insect product. In one embodiment, the solid insect matter particles present in the dried insect product are in amount from about 90% to about 100% by weight of the dried insect product. In another embodiment, the solid insect matter particles present in the dried insect product are in amount from about 95% to about 100% by weight of the dried insect product. In yet another embodiment, the solid insect matter particles present in the dried insect product are in amount from about 95% to about 99% by weight of the dried insect product. In another embodiment, the solid insect matter particles present in the dried insect product are in amount from about 95% to about 98% by weight of the dried insect product. In yet another embodiment, the solid insect matter particles present in the dried insect product are in amount from about 96% to about 98% by weight of the dried insect product. In a further embodiment, the solid insect matter particles present in the dried insect product are in amount from about 97% to about 100% by weight of the dried insect product.

The term "wet-grinding," as used herein, is defined as a grinding process of at least one whole non-dewatered insect with or without added liquid, such as water. In one embodiment, wet-grinding includes one grinding step that grinds the at least one whole insect to desired particle sizes (e.g., particles sizes of about 1000 µm or less). In other embodiments, wet-grinding includes two separate grinding steps: a coarse wet-grinding and a fine wet-grinding. A coarse wet-grinding process grinds the at least one whole insect to particle sizes of about 5 mm or less (e.g., particles sizes from about 1 mm to about 5 mm). A fine wet-grinding process grinds the at least one whole insect to particle sizes of about 1000 µm or less (e.g., particles sizes from about 1 µm to about 1000 µm). In embodiments, a fine wet-grinding process may grind the at least one whole insect to particle sizes from about 1 µm to about 100 µm, from about 1 µm to 50 µm, or from about 1 µm to 10 µm.

The advantages of wet-stage grinding include, for example: (1) reducing heat needed to preserve and dry the insect slurry; (2) minimizing/avoiding the negative effects heat has on the insect product properties; (3) increasing process efficiency; (4) improving product digestibility; and (5) improving process throughputs.

The wet-grinding process may be performed using at least one of, but not limited to, the following devices: grinders, mills, stone mills, mixers, peanut grinders, peanut butter grinders, colloid mills, pin mills, bead mills, dispersers, homogenizers, choppers, rotor stator devices, hammer mills, press grinders, mashers, macerators, food processors, rollers, or juicers. In one embodiment, the grinder is selected from at least one of the following: an Olde Tyme Peanut Mill, Olde Tyme Peanut Grinder, Olde Tyme Peanut butter Grinder, Olde Tyme Peanut butter Mill, Old Style Peanut Mill, Olde Style Peanut Grinder, Olde Style Peanut butter Grinder, Olde Style Peanut butter Mill, IKA mixer, or IKA colloid mill. In another embodiment, the juicer is a Jack LaLanne Power Juicer or an Acme 6001 Centrifugal Juicer.

Figure 1:
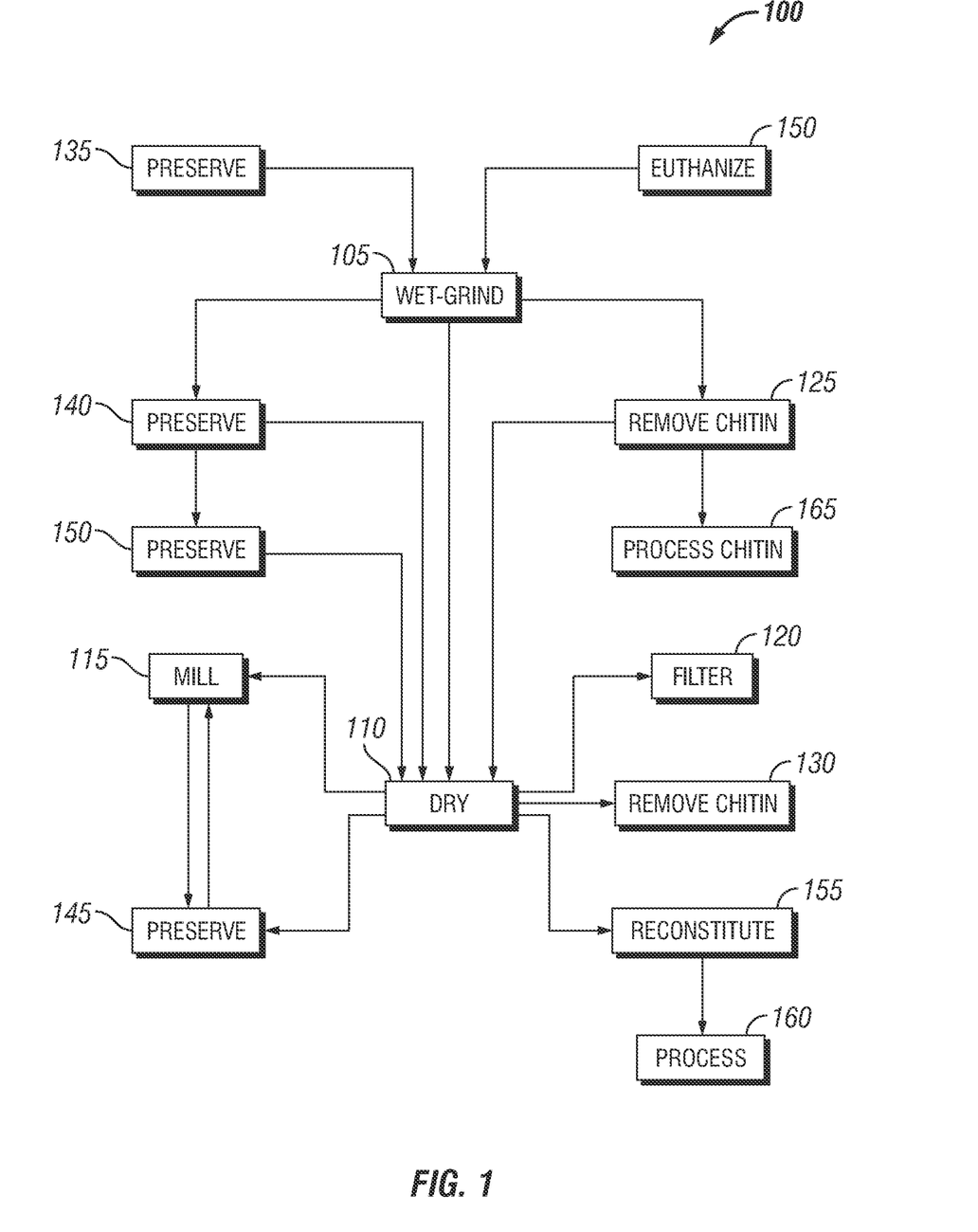
FIG. 1 is a process flow diagram that illustrates various method trajectories for fabrication of an insect product in accordance with embodiments of the present disclosure.

FIG. 1 illustrates exemplary methods and exemplary method sequences for producing an insect product as described herein. In one embodiment, the method 100 of producing an insect product includes wet-grinding 105 at least one whole insect into an insect slurry and drying 110 the insect slurry to form a dried insect product comprising solid insect matter particles. In another embodiment, drying 110 includes spray drying or drum drying. In yet another embodiment, the at least one whole insect includes at least one whole unwashed insect, at least one whole adult insect, or at least one whole live insect.

In other embodiments, the methods for producing an insect product described herein may include additional steps in various method sequences as also illustrated in FIG. 1.

In one embodiment, the method 100 further comprises milling 115 the solid insect matter particles of the dried insect product. Non-limiting examples of devices that are suitable for milling include a stone mill, colloid mill, pin mill, bead mill, wiley mill, or hammer mill. In embodiments, where the solid insect matter particles are milled, about 90% of the milled solid insect matter particles, by volume, may have a particle size of about 100 µm or less. The advantages of the optional post-dry milling include, for example, (1) providing lighter colored, fluffier, finer, product; (2) improving ability to combine product with other ingredients; (3) improving oil/fat binding; and (4) preventing damage equipment or materials when used in downstream applications.

In some embodiments, the method 100 further comprises filtering 120 the dried insect product. In one embodiment, the step of filtering is used to separate the chitin particulates from the dried insect product. This step may also be used to remove any remaining undesirable or large particles. Non-limiting examples of devices that are suitable for filtering include: sifters, separators, sieves, shaking sifters, gravity feed sifters, vibratory sifters, vibratory sieves, or Sweco sifters.

In embodiments where the method further comprises filtering the dried insect product, the method may also further comprise preserving the dried insect product prior to the step of filtering, after the step of filtering, or a combination thereof.

In some embodiments, the method 100 further comprises removing chitin 125 from at least a portion of the insect slurry prior to the step of drying 110. In such embodiments, the method 100 further comprises processing the removed chitin 165. The step of processing the removed chitin may include preserving the chitin or treating the chitin with an acid, a base, or a solvent. In yet another embodiment, the method 100 further comprises removing chitin 130 from at least a portion of the dried insect product.

In embodiments where the method further comprises removing chitin from at least a portion of the insect slurry prior to the step of drying, the method may also further comprise preserving the whole insect prior to the step of wet-grinding, preserving the insect slurry prior to the step of removing the chitin, preserving the insect slurry between the step of removing the chitin and the step of drying, preserving the dried insect product after the step of drying, or any combination thereof. In such embodiments, the method may further comprise milling the solid insect matter particles of the dried insect product.

Non-liming examples of devices that can be employed to remove chitin from the insect slurry and/or dried insect product include: cheese cloths, filtration apparatuses, sifters, sieves, filter baskets, filter presses, centrifuges, peeler centrifuges, inverting centrifuges, centrifuge pulpers, decanting centrifuges, separators, finishers, pulper finishers, or juicers with filtration ability. In one embodiment, the step of removing chitin is used with a pulp ejecting juicer, such as a Jack LaLanne juicer. In an exemplary embodiment, this step is conducted with a centrifugal juicer with a filter basket. In at least one embodiment, the pores in the apparatus used in the removal are 0.5 to 1 mm in diameter. In one embodiment, a filter press is used that utilizes pressure, such as hydraulic or air pressure, to force the insect slurry through a filter or filter cloth. It is desirable to use an open mesh/pore size filter cloth so as to retain the larger pieces of chitin from the broken insects while allowing liquid and soft tissue or the insect, such as muscle and fat, to pass through the filter pores. In another embodiment, the step of removing chitin is conducted through the use of a centrifuge.

The separated and removed chitin from the insect slurry, the dried insect product or both, may be used in other applications. Without being limited to a single theory, chitin from insects processes easier than chitin from the more currently common crustacean or marine sources because it is less mineralized. Non-limiting examples include a fiber additive, an abrasive, nutraceuticals, pharmaceuticals, nutrient supplements, food additives, a base component for making chitosan, gene delivery reagents, or a raw material for making plastics and films. In one embodiment, the removed chitin is further processed. For example, the removed chitin is processed via preservation methods or treated with a strong acid, base, or solvent. In another embodiment, the removed chitin is used to derive chitosan, such as through deacetylation methods and/or treatment with sodium hydroxide.

In some embodiments, the method 100 also comprises preserving 135 the at least one whole insect prior to the step of wet-grinding 105. In one embodiment, the method 100 comprises preserving 140 the insect slurry prior to the step of drying 110. In another embodiment, the method 100 comprises preserving 145 the dried insect product. In any of these embodiments, the method 100 may further comprise milling 115 the solid insect matter particles of the dried insect product.

In some embodiments, the method 100 further includes two separate preservation steps 135, 140, 145, 150. In one embodiment, at least one preservation step 135 occurs prior to the step of wet-grinding 105. In another embodiment, at least one preservation step 140 occurs between the step of wet-grinding 105 and the step of drying 110. In yet another embodiment, two preservation steps 140, 150 occur between the step of wet-grinding 105 and the step of drying 110. One of the advantages of two preservation steps includes, for example, lower micro-counts in the resulting insect product.

In embodiments where the method includes either one or two preservation steps, the step of wet-grinding may include two separate grinding steps, in which the first grinding step is a coarse wet-grinding and the second grinding step is a fine wet-grinding. For example, in one embodiment the method includes coarse wet-grinding, fine wet-grinding, preserving the insect slurry, and then drying the insect slurry into a dried insect product. In another example, the method includes preserving the insects prior to wet-grinding, coarse wet-grinding, fine wet-grinding, and then drying the insect slurry into a dried insect product. In another example, the method includes coarse wet-grinding, fine wet-grinding, preserving the insect slurry in two separate and sequential preservation steps, and then drying the insect slurry into a dried insect product.

In embodiments where the method also includes two preservation steps and the step of filtering the dried insect product, at least one preservation step may occur prior to the step of wet-grinding. In embodiments where the method also includes two preservation steps and the step of filtering the dried insect product, at least one preservation step may occur prior to the step of drying.

In embodiments where the method also includes two preservation steps and the step of removing chitin from at least a portion of the insect slurry prior to the step of drying, at least one preservation step may occur between the step of removing the chitin and the step of drying. In such embodiments, the method may further comprise milling solid insect matter particles of the dried insect product.

Non-limiting preservation methods include pasteurizing, sterilization, acidification, pressure, vacuum, cooking, heat treating, low heat storage, pickling, blanching, steaming, boiling, or a combination thereof. Other non-limiting examples include Vat pasteurization (heating at lower temperatures for longer time intervals), HTST (High Temperature Short Time) pasteurization, Ultra High Pasteurization, Aseptic Processing, High Pressure Processing, Ohmic heating, or Pulsed electrical field. Without being limited to a single theory, the step or steps of preservation protect key nutrients of the insect product while killing and/or reducing pathogens, microbes, or other living organisms that might be present inside or on the insects or otherwise carried into the process via incorporation of raw insects. This step may also improve the functionality and/or digestibility of the product for desired food product applications, such as improved binding.

In one embodiment, the insect slurry is heated to temperatures in the range of 130-200° F. (approx. 54.4-93.3° C.). Depending on the type of equipment utilized, temperatures may be applied for various time intervals (e.g. second(s), hour(s), day(s), week(s)). Times and temperatures employed for preservation could be similar to those standard to the food industry, such as for dairy, meats, and juices. In one embodiment, HTST pasteurization is utilized with a temperature in the range of 172-195° F. (approx. 77.7-90.5° C.) and an exposure time in the range of 3 to 15 seconds. In another embodiment, acidification is used in addition to or as an alternative to heat treating the insect slurry by using acids, such as citric acid, to preserve the insect liquid by lowering the pH below 4.6. In yet another embodiment, the insects are preserved by boiling in a liquid, such as saline, brine solution, lactic acid, vinegar; or acetic acid.

In some embodiments, the step of preserving is conducted after the insect is dried. This may be necessary if microbiological analysis of the product shows unacceptable levels of microbes, bacteria or pathogens. In one embodiment, the dried insect product is heated for a period of time to kill pathogens/organisms/viruses. For example, the dried insect product may be heated at 130° F. (approx. 54.4° C.) for a predetermined period of time (e.g. 7 days). In another embodiment, the dried insect product is re-hydrated or dissolved into a liquid and then the liquid is preserved by at least one, but not limited to, any of the above listed preservation methods. The preserved re-constituted liquid insect liquid may then be dried or kept as a liquid for further processing.

In some embodiments, the method 100 further includes euthanizing 150 the at least one whole insect prior to the step of wet-grinding 105. Non-limiting examples of suitable euthanizing processes include freezing, fumigating, soaking in liquid, smashing, suffocating with $CO_2$ or $N_2$ atmosphere, applying electric current, heating, or cooking. In embodiments where the method 100 comprises preserving the insect slurry in two separation preservation steps 135, 140, 145, 150, at least one of the two preservation steps 135 may also euthanize the at least one whole insect.

In some embodiments, the method 100 further includes reconstituting 155 the dried insect product into a liquid form to produce a liquid insect product. In such an embodiment, the method 100 may also include processing 160 the liquid insect product into the form of a paste or a solid.

Figure 2:
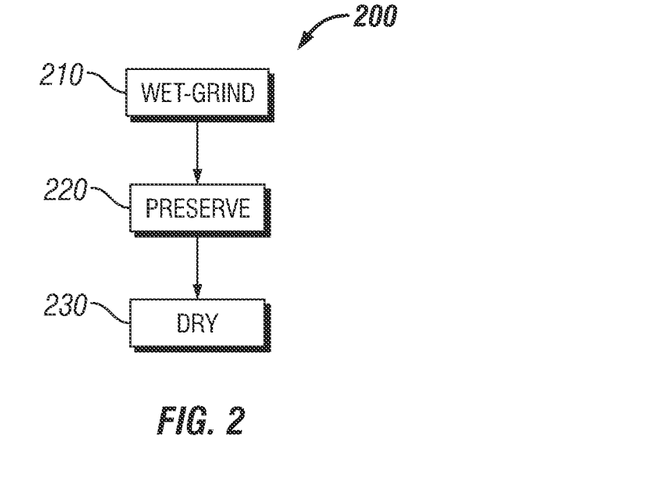
FIG. 2 is a process flow diagram that illustrates fabrication of an insect product in accordance with an embodiment of the present disclosure.

In one embodiment, illustrated in FIG. 2, the method 200 for producing an insect product as described herein includes wet-grinding 210 at least one whole insect into an insect slurry, preserving 220 the insect slurry, and drying 230 the insect slurry to form a dried insect product comprising solid insect matter particles. In one further embodiment, the step of wet-grinding of method 200 includes two separate grinding steps, wherein the first grinding step is a coarse wet-grinding and the second grinding step is a fine wet-grinding.

In yet a further embodiment, the method 200 also includes milling the solid insect matter particles of the dried insect product.

Figure 3:
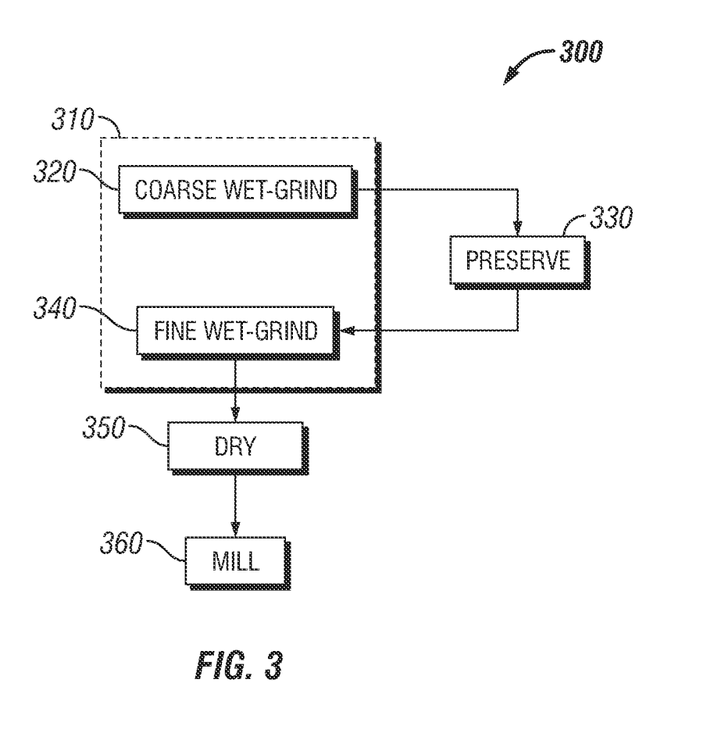
FIG. 3 is a process flow diagram that illustrates fabrication of an insect product in accordance with another embodiment of the present disclosure.

In another embodiment, illustrated in FIG. 3, the method 300 includes wet-grinding 310 in two separate grinding steps, a coarse wet-grinding 320 and a fine wet-grinding 340, preserving 330 the insect slurry between the coarse wet-grinding 320 and the fine wet-grinding 340, drying 350 the insect slurry and milling 360 the solid insect matter particles of the dried insect product.

Figure 4:
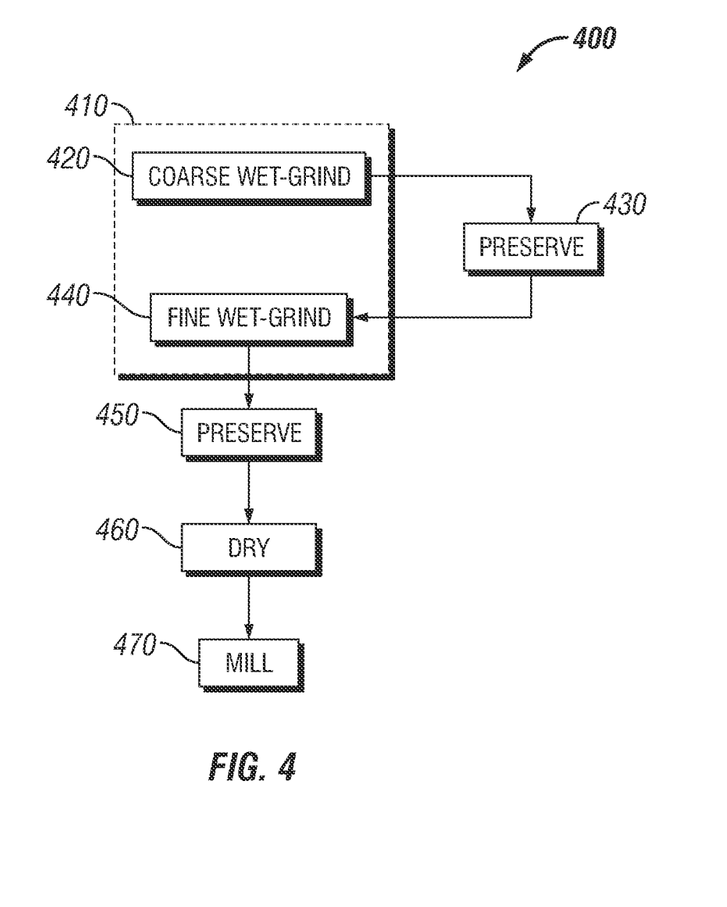
FIG. 4 is a process flow diagram that illustrates fabrication of an insect product in accordance with yet another embodiment of the present disclosure.

In yet another embodiment, illustrated in FIG. 4, the method 400 includes wet-grinding 410 in two separate grinding steps, a coarse wet-grinding 420 and a fine wet-grinding 440, preserving the insect slurry in two separate preservation steps 430, 450 in which at least one preservation step 430 occurs between the coarse wet-grinding 420 and the fine wet-grinding 440, drying 460 the insect slurry and milling 470 the solid insect matter particles of the dried insect product.

The insect product and methods may be further understood with the following non-limiting examples.

Example 1

Preparation of Insect Product

Approximately 1680 pounds (approx. 762 kg) of water at 140° F. (60° C.) and approximately 840 pounds (approx. 381 kg) of frozen crickets were combined in an 1,100 gallon (approx. 4,163.9 L) steam jacketed processor with a dual paddle Lightnin agitator operating at high speed to form an insect slurry. The insect slurry temperature was then raised to 190° F. (approx. 87.7° C.) for 30 minutes (first pasteurization step). The temperature of the slurry was then reduced to 140° F. (60° C.) and then transferred via a disperser (IKA 2000-5 using "coarse" tooling) to a second 1,100 gallon (approx. 4,163.9 L) steam jacketed processor. The disperser tooling was then changed to "medium" and the slurry was transferred via the disperser to the first processor, maintaining high speed agitation at 140° F. (60° C.). The disperser tooling was then changed to "fine" and the slurry was transferred back to the second processor, maintaining high speed agitation at 140° F. (60° C.). The insect slurry was heated to 190° F. (approx. 87.7° C.) and held for 30 minutes (second pasteurization step). The temperature of the slurry was then reduced temperature to 140° F. (60° C.) and fed to the spray drier.

The above process was repeated with approximately 2620 pounds (approx. 1188.4 kg) of water at 140° F. (60° C.) and approximately 1310 pounds (approx. 594.2 kg) of frozen crickets.

The combined batches yielded approximately 592 pounds (approx. 268.5) of insect product with a moisture content ranging from 4.7% to 5.3%, as measured by a Sartoris Omnimark Mark 3 moisture analyzer.

Example 2

Preparation of Insect Product

In a 100 gallon (approx. 378.5 L) steam jacketed kettle, 200 pounds (approx. 90.7 kg) of water at 140° F. (60° C.) and 100 pounds (approx. 45.3 kg) of frozen crickets were combined together to start the grinding process via a high shear mixer-homogenizer (Silverson Model EX-60) to form an insect slurry. The slurry temperature was then held at 140° F. (60° C.) while an additional 200 pounds (approx. 90.7 kg) of water at 140° F. (60° C.) and 100 pounds (approx. 45.3 kg) of frozen crickets were gradually added. Once the slurry was homogenized, the slurry was transferred via a disperser (IKA 2000-5) to a 1,100 gallon (approx. 3.78 L) low pressure steam jacketed processor batch tank, where the slurry was held at 165° F. (approx. 73.8° C.) (first preservation step).

The above process was repeated 5 times to yield a total of 6 drying batches. 238 pounds (approx. 107.9 kg) of rework powder (previously processed insect powder) was added evenly across the 6 drying batches, after which the temperature of each batch tank was raised to 180° F. (approx. 82.2° C.) and maintained for 1 hour (second preservation step). The contents of each batch tank were transferred via a peristaltic pump to the dryer feed tank, where it was held at 165° F. (approx. 73.8° C.) and fed to a spray drier to yield a total of 2,119 pounds (approx. 961.1 kg) of insect product at 4.25% moisture content. The moisture content was measured via a Sartorius Omnimark Mark 3 moisture analyzer.

Example 3

Preparation of Insect Product

Approximately 20 pounds (approx. 9.07 kg) of insect product as prepared in Example 2 was micronized using a jet mill. The insect product was first screened over 20 mesh via an Air Jet Sieve to remove oversize particles (e.g., hard exoskeleton and antenna). The sieved material was then fed using a feeder (a Ktron volumetric twin screw feeder) to a jet mill (Sturtevant 4" spiral mill). The resulting material was composited in a single liner and measured for particle size distribution using a S3500 Mictrotrac. The particle distribution measurements yielded 90% of the material by volume distribution was less 43.96 µm, 50% of the material by volume distribution was less than 10.56 µm, and 10% of the material by volume distribution was less than 2.657 µm.

Example 4

Characterization of Insect Product

A samples of insect product, as prepared in Example 1 (Sample 1), as prepared in Example 2 (Sample 2), and as prepared in Example 3 (Sample 3) were each characterized. A sample of Protein2050-C Cricket Flour from Next Millennium Farms (Commercial Sample) was also characterized to demonstrate the differences that exist among the insect products made herein and a commercial insect product. Table 1 shows the various analyses performed and the methods used.

TABLE 1

| Analysis preformed. | |
|---|---|
| Analysis | Method of Reference |
| Ash, Overnight | AOAC: 923.03 |
| Calcium | AOAC: 975.03, 985.01, 990.08 |
| Calories | Determined through calculation* |
| Carbohydrates | Determined through calculation** |
| Carotenoids | AOAC: 2005.07 with modification of the method for extraction |
| Copper | AOAC: 975.03, 985.01, 990.08 |
| Cysteine and Methionine | AOAC: 994.12 with modification of the method for hydrolysis and extraction |

TABLE 1-continued

Analysis preformed.

| Analysis | Method of Reference |
|---|---|
| Dietary Fiber | AOAC: 991.43 with modification of the centrifugation method for fiber recovery |
| Fats, by Gas Chromatography | AOAC: 996.06 with modification of the dilution with Ethanol instead of Hydrochloric Acid |
| Folic Acid | AOAC: 2011.06 |
| Hexanal | Internal Method*** |
| Iron | AOAC: 975.03, 985.01, 990.08 |
| Magnesium | AOAC: 975.03, 985.01, 990.08 |
| Manganese | AOAC: 975.03, 985.01, 990.08 |
| Minolta Color | Hunter L, a, b color scale (as described above) |
| Moisture by Vacuum Oven (70° C./16 hrs) | AOAC: 945.43 |
| Niacin | AOAC: 944.13, 960.46 |
| Particle Size Distribution | Laser Diffraction Method**** |
| Peroxide Value | AOCS: CD-8-53 |
| Phosphorus | AOAC: 975.03, 985.01, 990.08 |
| Potassium | AOAC: 975.03, 985.01, 990.08 |
| Protein, by Dumas | AOAC: 992.15; AACC: 46-30 |
| Sodium | AOAC: 975.03, 985.01, 990.08 |
| Sugars by HPLC | AOAC: 977.20 with modification of the method for extraction |
| Taurine | AOAC: 994.12 - modification of the method for hydrolysis and extraction |
| Tryptophan | AOAC: 994.12 - modification of the method for hydrolysis and extraction |
| Water Activity | AOAC: 978.18 |
| Zinc | AOAC: 975.03, 985.01, 990.08 |

*Calories Method: Calculated from the results of the analytical tests of: moisture, ash, fat, protein and optionally insoluble dietary fiber. Calories = (4xAvailable Carbohydrates (Fiber subtracted from the Carbohydrates)) + (9xTotal Fat) + (4xProtein)
**Carbohydrates Method: Calculated from the results of the analytical tests of: moisture, ash, fat, and protein. Carbohydrates = 100 − (Moisture) − (Ash) − (Total Fat) − Protein
***Hexanal Method: a homogenous portion of a sample is mixed with water containing an internal standard. It is heated in a heating block for a specified amount of time, after which a sample of the headspace over the mixture is taken and injected into the gas chromatograph. The hexanal released into the headspace is quantitated via comparison of the hexanal gas's chromatographic response to that of the internal standard.
****Laser Diffraction Method: Particles are dispersed in a carrier fluid of isopropanol and measured via laser diffraction. Laser Diffraction provides a complete volumetric size distribution without the physical separation required by sieves. Particle size distributions are characterized by percentages of a sample in 20 channels covering a total range of 0.12 to 1500 micrometers diameter. The particle size is expressed as a spherical diameter (or an equivalent thereof if non-spherical particles are being measured). For expressing laser diffraction results herein the D10 (10% of particles are below this value), D50 (50% of particles are below this value), and D90 (90% of particles are below this value) values based on a volume distribution is reported.

TABLE 2

Results obtained from the analyses listed in Table 1.

| Analysis | Units | Sample 1 | Sample 2 | Sample 3 | Commercial Sample |
|---|---|---|---|---|---|
| Ash, Overnight | % by weight of sample | 5.60 | 4.601 | n/a | n/a |
| Calcium | mg/100 g of sample | 147 | 163 | n/a | n/a |
| Calories | Calories/100 g of sample | 447 | 461 | n/a | n/a |
| Carbohydrates | % by weight of sample | 5.9 | 6.7% | n/a | n/a |
| Carotenoids | | | | | |
| alpha Carotene | IU/100 g of sample | <0.5 | n/a | <0.5 | <0.5 |
| trans beta Carotene | IU/100 g of sample | <0.5 | n/a | <0.5 | <0.5 |
| cis beta Carotene | IU/100 g of sample | <0.5 | n/a | <0.5 | <0.5 |
| Total Carotene | IU/100 g of sample | 0.000 | n/a | 0.000 | 0.000 |
| Copper | mg/100 g of sample | 0.560 | 0.725 | n/a | n/a |
| Cysteine | % by weight of sample | 0.445 | 0.425 | 0.438 | 0.440 |
| Methionine | % by weight of sample | 0.902 | 0.821 | 0.899 | 0.861 |
| Dietary Fiber | % by weight of sample | 6.6 | 7.3 | n/a | n/a |
| Fats, by Gas Chromatography | | | | | |
| Saturated Fat | % by weight of sample | 6.46 | 6.90 | 6.23 | 7.9 |
| Mono-unsaturated Fat | % by weight of sample | 4.62 | 4.93 | 4.62 | 4.58 |
| cis-cis Poly-unsaturated Fat | % by weight of sample | 6.99 | 6.86 | 6.22 | 11.09 |
| trans Fat | % by weight of sample | 0.28 | 0.29 | 0.30 | 0.29 |
| Total Fat | % by weight of sample | 19.22 | 19.86 | 18.22 | 24.98 |
| Folic Acid | μg/100 g of sample | 148.3 | n/a | 42.92 | 96.15 |
| Hexanal | ppm | n/a | n/a | 0.780 | 0.620 |
| Iron | mg/100 g of sample | 5.89 | 5.93 | n/a | n/a |
| Magnesium | mg/100 g of sample | 118 | 111 | n/a | n/a |
| Manganese | mg/100 g of sample | 3.87 | 3.85 | n/a | n/a |
| Minolta Color | | | | | |
| L | | n/a | n/a | 70.69 | 38.55 |
| a | | n/a | n/a | 3.05 | 5.58 |
| b | | n/a | n/a | 14.81 | 13.22 |
| Moisture by Vacuum Oven (70° C./16 hrs) | % by weight of sample | 6.64 | 5.012 | 0.361 | 0.643 |
| Niacin | mg/100 g of sample | 7.394 | n/a | 8.195 | 6.671 |

TABLE 2-continued

Results obtained from the analyses listed in Table 1.

| Analysis | Units | Sample 1 | Sample 2 | Sample 3 | Commercial Sample |
|---|---|---|---|---|---|
| Particle Size Distribution (PSD) | | | | | |
| D90 | μm | n/a | 855.1 | 43.96 | 805.1 |
| D50 | μm | n/a | 168.1 | 10.57 | 205.6 |
| D10 | μm | n/a | 12.63 | 2.657 | 20.75 |
| Peroxide Value | meq/kg of fat | n/a | n/a | 0.837 | 1.58 |
| Phosphorus | mg/100 g of sample | 771 | 785 | n/a | n/a |
| Potassium | mg/100 g of sample | 1010 | 1050 | n/a | n/a |
| Protein, by Dumas | % by weight of sample | 62.6 | 63.8 | 63.8 | n/a |
| Sodium | mg/100 g of sample | 391 | 403 | n/a | n/a |
| Sugars | | | | | |
| Fructose | % by weight of sample | 0.144 | n/a | n/a | n/a |
| Glucose | % by weight of sample | <0.1 | n/a | n/a | n/a |
| Sucrose | % by weight of sample | <0.1 | n/a | n/a | n/a |
| Maltose | % by weight of sample | <0.1 | n/a | n/a | n/a |
| Lactose | % by weight of sample | <0.1 | n/a | n/a | n/a |
| Total Sugars | % by weight of sample | 0.144 | n/a | n/a | n/a |
| Taurine | ppm | 2097 | 3094 | n/a | n/a |
| Tryptophan | g/100 g of sample | 0.500 | 0.516 | n/a | n/a |
| Water Activity | aw | 0.415 | n/a | 0.336 | 0.260 |
| Zinc | mg/100 g of sample | 17.3 | 19.0 | n/a | n/a |

Example 5

Amino Acid Analysis

An amino acid analysis was performed on a sample of insect product, as prepared in Example 1 (Sample 1) and as prepared in Example 2 (Sample 2). Table 3 shows the various analyses performed and the methods used for determining the amino acids content of each sample. For the amino acids test method, AOAC Official Method 994.12 with modification of the method for hydrolysis and extraction was used as a guideline.

TABLE 3

Results of the Amino Acid Analysis.

| Analysis | Sample 1 (% by weight of sample) | Sample 2 (% by weight of sample) |
|---|---|---|
| Aspartic Acid | 4.407 | 4.233 |
| Threonine | 1.767 | 1.789 |
| Serine | 2.297 | 2.131 |
| Glutamic Acid | 5.309 | 5.196 |
| Proline | 2.733 | 2.635 |
| Glycine | 2.174 | 2.256 |
| Alanine | 4.592 | 4.382 |
| Valine | 2.737 | 2.730 |
| Isoleucine | 2.055 | 2.037 |
| Leucine | 3.559 | 3.539 |
| Tyrosine | 2.531 | 2.504 |
| Phenylalanine | 1.751 | 1.832 |
| Lysine | 2.763 | 2.759 |
| Histidine | 1.150 | 1.128 |
| Arginine | 3.078 | 3.261 |
| Total Hydrolyzed Amino Acids | 42.903 | 42.412 |

Example 6

Triglyceride Analysis

A triglyceride analysis was performed on a sample of insect product, as prepared in Example 1 (Sample 1), as prepared in Example 2 (Sample 2), and as prepared in Example 3 (Sample 3). A sample of Protein2050-C Cricket Flour from Next Millennium Farms (Commercial Sample) was also calculated to demonstrate the differences that exist among the insect products made herein and a commercial insect product. Tables 4, 5, 6, and 7 show the various triglycerides tested and the content present in Sample 1, Sample 2, Sample 3, and Commercial Sample, respectively. For the triglycerides test method, AOAC Official Method 996.06 with the modification of using Ethanol instead of Hydrochloric Acid for dilution was used as a guideline.

TABLE 4

Results of Triglyceride Analysis for Sample 1.

| Component | Normalized by Weight (% of total fat) | % (w/w) as Triglyceride in Product |
|---|---|---|
| 12.0 Lauric | 0.057 | 0.011 |
| 14:0 Myristic | 0.546 | 0.105 |
| 14:1 t-Tetradecanoic | 0.052 | 0.010 |
| 15:0 Pentadecanoic | 0.078 | 0.015 |
| 16:0 Palmitic | 24.498 | 4.709 |
| 16:1 t-Hexadecenoic | 0.458 | 0.088 |
| 16:1 Palmitoleic | 0.812 | 0.156 |
| 17:0 Margaric | 0.281 | 0.054 |
| 17:1 Margaroleic | 0.130 | 0.025 |
| 18:0 Stearic | 9.083 | 1.746 |
| 18:1 trans-Elaidic | 0.531 | 0.102 |
| 18:1 Oleic | 23.952 | 4.604 |
| 18:2 t-Octadecadienoic | 0.499 | 0.096 |
| 18:2 Linoleic | 36.391 | 6.995 |
| 20:0 Arachidic | 0.536 | 0.103 |
| 20:1 Gadoleic | 0.213 | 0.041 |
| 18:3 Linolenic | 1.145 | 0.220 |

TABLE 4-continued

Results of Triglyceride Analysis for Sample 1.

| Component | Normalized by Weight (% of total fat) | % (w/w) as Triglyceride in Product |
|---|---|---|
| 18:2 conjugated-Lenoleic | 0.125 | 0.024 |
| 22:0 Behenic | 0.140 | 0.027 |
| 20:4 Arachiodonic | 0.265 | 0.051 |
| 20:5 Eicosapentaenoic | 0.208 | 0.040 |

TABLE 5

Results of Triglyceride Analysis for Sample 2.

| Component | Normalized by Weight (% of total fat) | % (w/w) as Triglyceride in Product |
|---|---|---|
| 14:0 Myristic | 0.630 | 0.125 |
| 16:0 Palmitic | 24.994 | 4.963 |
| 16:1 t-Hexadecenoic | 0.413 | 0.082 |
| 16:1 Palmitoleic | 0.962 | 0.191 |
| 17:0 Margaric | 0.383 | 0.076 |
| 18:0 Stearic | 9.523 | 1.891 |
| 18:1 trans-Elaidic | 0.670 | 0.133 |
| 18:1 Oleic | 24.802 | 4.925 |
| 18:2 t-Octadecadienoic | 0.423 | 0.084 |
| 18:2 Linoleic | 34.557 | 6.862 |
| 20:0 Arachidic | 0.524 | 0.104 |
| 20:1 Gadoleic | 0.176 | 0.035 |
| 18:3 Linolenic | 1.178 | 0.234 |
| 21:0 Heneicosanoic | 0.212 | 0.042 |
| 22:0 Behenic | 0.161 | 0.032 |
| 20:4 Arachiodonic | 0.196 | 0.039 |
| 20:5 Eicosapentaenoic | 0.196 | 0.039 |

TABLE 6

Results of Triglyceride Analysis for Sample 3.

| Component | Normalized by Weight (% of total fat) | % (w/w) as Triglyceride in Product |
|---|---|---|
| 12:0 Lauric | 0.049 | 0.009 |
| 14:0 Myristic | 0.626 | 0.114 |
| 14:1 t-Tetradecanoic | 0.060 | 0.011 |
| 14:1 Myristoleic | 0.033 | 0.006 |
| 15:0 Pentadecanoic | 0.121 | 0.022 |
| 16:0 Palmitric | 24.739 | 4.507 |
| 16:1 t-Hexadecenoic | 0.483 | 0.088 |
| 16:1 Palmitoleic | 1.070 | 0.195 |
| 17:0 Margaric | 0.368 | 0.067 |
| 17:1 Margaroleic | 0.225 | 0.041 |
| 18:0 Stearic | 9.277 | 1.690 |
| 18:1 trans-Elaidic | 0.697 | 0.127 |
| 18:1 Oleic | 24.827 | 4.523 |
| 18:2 t-Octadecadienoic | 0.478 | 0.087 |
| 18:2 Linoleic | 33.511 | 6.105 |
| 20:0 Arachidic | 0.494 | 0.090 |
| 20:1 Gadoleic | 0.351 | 0.064 |
| 18:3 Linolenic | 1.186 | 0.216 |
| 18:2 conjugated-Linoleic | 0.263 | 0.048 |
| 20:2 Eicosadienoic | 0.077 | 0.014 |
| 22:0 Behenic | 0.137 | 0.025 |
| 20:3 g-Eicosatrienoic | 0.318 | 0.058 |
| 22:1 Erucic | 0.005 | 0.001 |
| 20:4 Arachiodonic | 0.198 | 0.036 |
| 22:2 Docasadienoic | 0.066 | 0.012 |
| 24:0 Lignoceric | 0.027 | 0.005 |
| 20:5 Eicosapentaenoic | 0.225 | 0.041 |
| 22:4 Docosatretraenoic | 0.088 | 0.016 |

TABLE 7

Results of Triglyceride Analysis for Commercial Sample.

| Component | Normalized by Weight (% of total fat) | % (w/w) as Triglyceride in Product |
|---|---|---|
| 12:0 Lauric | 0.044 | 0.011 |
| 13:0 Tridecanoic | 0.016 | 0.004 |
| 14:0 Myristic | 0.568 | 0.142 |
| 14:1 t-Tetradecanoic | 0.056 | 0.014 |
| 14:1 Myristoleic | 0.008 | 0.002 |
| 15:0 Pentadecanoic | 0.084 | 0.021 |
| 16:0 Palmitic | 20.326 | 5.078 |
| 16:1 t-Hexadecenoic | 0.520 | 0.130 |
| 16:1 Palmitoleic | 0.320 | 0.080 |
| 17:0 Margaric | 0.224 | 0.056 |
| 17:1 Margaroleic | 0.248 | 0.062 |
| 18:0 Stearic | 11.200 | 2.798 |
| 18:1 trans-Elaidic | 0.296 | 0.074 |
| 18:1 Oleic | 18.461 | 4.612 |
| 18:2 t-Octadecadienoic | 0.336 | 0.084 |
| 18:2 Linoleic | 39.751 | 9.931 |
| 20:0 Arachidic | 0.568 | 0.142 |
| 20:1 Gadoleic | 0.128 | 0.032 |
| 18:3 Lenolenic | 6.556 | 1.638 |
| 18:2 conjugated Lenoleic | 0.044 | 0.011 |
| 20:2 Eicosadienoic | 0.068 | 0.017 |
| 22:0 Behenic | 0.124 | 0.031 |
| 20:3 Eicosatrienoic | 0.008 | 0.002 |
| 20:4 Arachiodonic | 0.016 | 0.004 |
| 24:0 Lignoceric | 0.028 | 0.007 |

Example 7

Microbial Analysis

A microbial analysis was performed on a sample of the insect product as prepared in Example 1 (Sample 1) and Example 2 (Sample 2) to demonstrate the affects two preservation steps has on the microbiology of the resulting product. Table 8 shows the various microbial analyses performed and the methods used.

TABLE 8

Microbial analyses performed.

| Analysis | Method Reference |
|---|---|
| Aerobic Plate Count | AOAC: 966.23 |
| Coliforms/E. coli | AOAC: 991.14 |
| Listeria | AOAC: 011201 |
| Salmonella | AOAC: 031201 |
| Yeast and Mold | FDA BAM Ch. 18; APHA CMMEF Ch. 20 using a Dichloran Rose Bengal Chloramphenicol agar |

The results of these analyses are shown in Table 9.

TABLE 9

Results obtained from the Microbial Analyses listed in Table 8.

| Analysis | Units | Sample 1 | Sample 2 |
|---|---|---|---|
| Aerobic Plate Count | CFU/g | 1.1E5 | 1.9E3 |
| Coliforms | CFU/g | <10 | <10 |
| E. coli | CFU/g | <10 | <10 |
| Listeria | Positive or Negative/25 grams | Negative/25 grams | Negative/25 grams |
| Salmonella | Positive or Negative/25 grams | Negative/25 grams | Negative/25 grams |
| Yeast | CFU/g | <10 | 10 |
| Mold | CFU/g | <10 | 100 |

Example 8

Aroma Analysis

An aroma analysis was performed to compare the aroma of a sample of the insect product, as prepared in Example 3, with the aroma of a sample of Protein2050-C Cricket Flour from Next Millennium Farms.

The aroma analysis was performed via the spectrum descriptive analysis method that uses a 0.0-15.0 point intensity scale. The aroma attributes evaluated were: overall aroma intensity, barnyard complex (comprised of Hay, Dirt/Earthy, Fecal), Malt, Nutty, Hydrolyzed Vegetable Protein, Mineral/Wet Concrete.

TABLE 10

Aroma Intensity References (Universal Scale).

| Label - 5 oz cups | Welch's Grape Juice | Water | Total Volume |
|---|---|---|---|
| 3.0 | 5 mL | 195 mL | 200 mL |
| 5.0 | 27.5 mL | 172.5 mL | 200 mL |
| 8.0 | 50 mL | 150 mL | 200 mL |
| 11.0 | 100 mL | 100 mL | 200 mL |
| 14.0 | 0 mL | 200 mL | 200 mL |

TABLE 11

Aromatic Character References.

| Code | Reference Sample | Preparation of Sample | Comments | Source |
|---|---|---|---|---|
| Malt | Malted Milk Balls | Serve as is | Serve at room temperature | GMI |
| Hydrolyzed Vegetable Protein | Knorr Beef Bouillon | Dissolve 1 cube in 2 cups boiling bottled water | Serve at room temperature | ASTM DS 66 |
| Barny/Barnyard | Aged White Pepper | Put some aged white pepper in a clean, small covered glass jar | | ASTM DS 66 |
| Earthy | Damp Potting Soil | Put some damp potting soil in a clean, small, covered glass jar | | ASTM DS 66 |

Seven trained assessors were served blind and monadically in 3 oz plastic cups each reference sample, a sample of insect product prepared in Example 3 (Sample 1), and a sample of Protein2050-C Cricket Flour from Next Millennium Farms (Commercial Sample). Each assessor evaluated the samples individually and a group discussion occurred after each test sample evaluation to determine a group consensus on the final rating. The results of the aroma evaluation are listed in Table 12. Scores for each attribute were collected and averaged into the final rating. Scores between test samples that had a difference of 0.5 or greater were identified as being significantly different. Scores between products that had a difference of 0.4 indicated a directional difference.

TABLE 12

Results of the Aroma Evaluation.

| | Sample 1 | Commercial Sample |
|---|---|---|
| OVERALL AROMA INTENSITY | 7.8 | 7.1 |
| BARNYARD COMPLEX | 2.5 | 4.0 |
| Hay | 1.7 | 2.2 |
| Dirt/Earthy | 0.5 | 1.5 |
| Fecal | 0.5 | 1.2 |
| OTHER ATTRIBUTES | | |
| Malt | 4.2 | 0.9 |
| Nutty | 1.2 (wheat germ-like) | 1.4 (walnut shell-like) |
| Hydrolyzed Vegetable Protein | 0.4 | 0.6 |
| Mineral/Wet Concrete | 0.0 | 0.4 |

Example 9

Surface Oil Analysis

A surface oil analysis was performed to compare the surface oil of a sample of the insect product (Sample 1), as prepared in Example 3, with the surface oil of a sample of Protein2050-C Cricket Flour from Next Millennium Farms (Commercial Sample). The amount of unencapsulated oil (i.e. free oil or surface oil) present at the surface of both products was determined as follows:

Fifteen millilitres of hexane was added to 2 g of product in a 30 ml glass vial with a screw cap and shaken with a vortex mixer for 2 min at ambient temperature to extract free oil. The solvent mixture was then decanted and filtered through a Whatman No. 1 filter paper. The collected washed product on the filter paper was rinsed three times with 20 ml of hexane at each time by passing it through the product. The residual product was dried in a fume hood overnight to vaporize all residual solvent. The residual product and pre-weighed filter paper were then placed on a lyophillizer to remove any accumulated moisture formed during the drying process. The free oil content was then calculated, according to the surface oil formula below, as percentage by the dry weight difference in the product before and after extraction and washing with hexane.

Surface Oil=((Initial Weight (g)−Defatted Weight (g))/(Initial Weight (g)))×100 where, Initial Weight (g)=Sample Weight (g)−(Sample Weight (g)×(Moisture %/100))

Duplicates of each sample were analyzed. It was determined that the insect product as prepared in Example 3 contained approximately 29.07% less surface oil on a relative basis than the Protein2050-C Cricket Flour from Next Millennium Farms.

TABLE 13

Surface Oil Measurement Results

| Sample | Average Surface Oil (%) | Standard Deviation (%) | Relative Standard Deviation (%) |
|---|---|---|---|
| Sample 1 | 16.73 | 0.74 | 4.43% |
| Commercial Sample | 22.42 | 0.74 | 3.30% |

Example 10

Preparation of Insect Product

Approximately 32.15 pounds (approx. 14.5 kg) of frozen crickets were thawed, then steamed for 10 minutes using a Dixie Steam Blancher. The resulting steamed crickets were then pre-milled with an IKA UTC batch mixer by gradually adding them to a tank of water until they were all incorporated. The crickets remained inside the UTC mill until the steamed cricket slurry was smooth. The steamed cricket slurry was then recirculated through an IKA MK Colloid Mill using a crosshatched mixing tool. The slurry was then spray dried using the following method:

Approximately 32.15 pounds (approx. 14.5 kg) of the steamed cricket slurry, with a moisture content of 89.8%, was heated and held at a temperature of approximately 100° F. (approx. 37.7° C.). The slurry was then pumped to the atomizer at the top of the spray dryer with a pump speed averaging 0.240 pounds (approx. 0.10 kg) per minute. The air pressure on the atomizer was set to 25 psi (approx. 172.3 kPa), the nozzle was a medium sized internal mixing nozzle. The furnace temperature was set to 510° F. (265.5° C.), actual furnace temperature averaged 520° F. (271.1° C.), with an inlet air temperature of approximately 338° F. (170° C.) and an outlet air temperature ranging from 169-188° F. (approx. 76.1-86.6° C.). The vacuum level of the drying chamber ranged between 0.20 inches/water (approx. 373 mTorr) and 0.30 inches/water (approx. 560 mTorr).

The resulting spray dried insect product had a final moisture level of approximately 7.23% measured by an Ohaus Moisture balance, and a final weight of approximately 4.59 pounds (approx. 2.08 kg).

Example 11

Preparation of Insect Product with Reduced Chitin

Approximately 38 pounds (approx. 17.2 kg) of crickets were ground into a paste-like composition with an Olde Tyme peanut grinder set on the narrowest setting between the grinding plates. Approximately 38 pounds (approx. 17.2 kg) of water was then added to the cricket composition and blended using a Stephen Mixer. This cricket slurry was then poured through a 14 mesh screen to remove the larger pieces of cricket chitin exoskeleton. The resulting liquid was then passed through a 30 mesh screen to remove about 80% of the remaining chitin exoskeleton parts. The resulting liquid was then poured into an ACME centrifugal juicer to remove the majority of the remaining chitin exoskeleton parts. The resulting liquid was then pasteurized between 172-195° F. (approx. 77.7-90.5° C.) in a Microthermics HTST (High Temperature Short Time) pasteurizer. A portion of the pasteurized insect slurry (approximately 32.45 pounds (0.25 kg)) was then spray dried. The moisture level of this liquid was determined to be approximately 90.07% using an Ohaus Moisture balance.

Spray drying process and parameters: Approximately 32.45 pounds (0.25 kg) of liquid material extracted from crickets, with reduced chitin, was held at a temperature of approximately 100° F. (37.7° C.). This cricket slurry was then pumped to the atomizer at the top of the spray dryer with a pump speed averaging 0.25 pounds (approx. 0.11 kg) per minute. The air pressure on the atomizer was set to 26 psi (approx. 179.2 kPa), the nozzle was a medium sized internal mixing nozzle. The furnace temperature was set to 520° F. (approx. 271.1° C.), actual furnace temperature averaged 532° F. (approx. 277.7° C.), with an inlet air temperature of approximately 352° F. (approx. 177.7° C.) and an outlet air temperature of 179-186° F. (approx. 81.6-85.5° C.). The vacuum level of the drying chamber ranged between 0.22 inches/water (approx. 411 mTorr) and 0.32 inches/water (approx. 597 mTorr). The cricket slurry dried into a fine tan free flowing powder, with a final moisture content of 8.89% measured by an Ohaus Moisture balance, and a final weight of 1,400.77 grams or 3.085 pounds after collecting all material in the cyclones and brushing down the entire dryer.

Example 12

Preparation of a Ground Meat Substitute from Insect Product with Reduced Chitin

Approximately 1 kg of raw frozen crickets were partly thawed and put into an Olde Tyme peanut grinder and ground to a course grind. Approximately 1 kg of water was added to this ground cricket composition and mixed. This cricket slurry was then poured slowly into an ACME 6001 centrifugal juicer until most of the liquid had been removed from the slurry, leaving the chitin insect exoskeleton cake behind inside the juicer's filter basket. The insect liquid was then poured into a non-stick pan and cooked on a stovetop for approximately 10 minutes, stirring regularly, until it had a fluffy ground-meat-like texture, look and aroma. Old El Paso brand taco seasoning (1 packet) was then added to this insect meat-like material and mixed. A lid was placed onto the non-stick pan and cooking was continued for another 5 minutes with the lid on. This resulted in approximately 350 grams of meat-like material with a flavor, texture and aroma very similar to ground beef typically made for tacos. A similar preparation utilizing superworms instead of crickets may be prepared.

Example 13

Preparation of a Ground Meat Substitute from Insect Product with Reduced Chitin

Approximately 50 grams of reduced chitin spray dried cricket powder prepared as described in Example 1 above was mixed with approximately 350 grams of water. The resulting re-suspended reduced chitin cricket liquid was then poured into a non-stick pan on a stovetop and cooked for approximately 3-5 minutes, stirring periodically, until it had a fluffy ground-meat like texture, look and aroma. After 5 minutes, a packet of Old El Paso taco seasoning (Medium spice/flavor, approximately 28 grams) was added to the cricket material in the pan, stirred and then covered with a lid. The ground insect meat was cooked for an additional 3-5 minutes covered with a lid. This resulted in approximately 170 grams of meat-like material with a flavor, texture and aroma very similar to ground beef typically made for tacos.

Example 14

Preparation of a Ground Meat Substitute from Insect Product

Approximately 50 grams of spray dried cricket powder prepared as described in Example 2 above was mixed with approximately 350 grams of water. The resulting re-suspended cricket liquid was then poured into a non-stick pan on a stovetop and cooked for approximately 3-5 minutes, stirring periodically, until it had a fluffy ground-meat like texture, look and aroma. After 5 minutes, a packet of Old El Paso taco seasoning (Medium spice/flavor, approximately 28 grams) was added to the cricket material in the pan, stirred and then covered with a lid. The ground cricket meat was cooked for an additional 3-5 minutes covered with a lid.

This resulted in approximately 185 grams of meat-like material with a flavor and aroma very similar to ground beef typically made for tacos. The texture was similar to meat, but with very fine fibrous pieces of chitin exoskeleton present throughout. The chitin material did not have an objectionable effect on the overall quality of the taco meat. A similar preparation utilizing superworms instead of crickets may be prepared.

Example 15

Preparation of a Ground Meat Substitute from Insect Paste with Chitin

Approximately 1 kilogram of raw frozen crickets were partly thawed and put into an Olde Tyme peanut grinder and ground to a course grind. Approximately 1 kilogram of water was added to this ground cricket composition and mixed. This cricket slurry was then poured into a non-stick pan and cooked on a stovetop for approximately 10 minutes, stirring regularly, until it had a fluffy ground-meat like texture, look, and aroma. Old El Paso brand taco seasoning (1 packet) was then added to this insect meat-like material and mixed. A lid was placed onto the non-stick pan and cooking was continued for another 5 minutes with the lid on. This resulted in approximately 500 grams of meat-like material with a flavor and aroma very similar to ground beef typically made for tacos, but with course fibrous pieces of chitin exoskeleton present throughout. A similar preparation utilizing superworms instead of crickets may be prepared.

Example 16

Preparation of Insect Product

Approximately 23 pounds (approx. 10.4 kg) of whole frozen crickets were ground through an Old Tyme Peanut Butter Ginder on the finest grind setting. Water was added to the cricket slurry on a 1:1 weight basis and blended until smooth. The insect slurry was then passed through a 30 mesh screen to remove the larger particulate and ran through a Acme juicer in small batches until approximately 21 pounds (approx. 9.5 kg) was collected. The insect slurry was then pasteurized by heating to 175° F. (approx. 79.4° C.) in a water bath set up and held at 175° F. (approx. 79.4° C.) for 10 minutes with constant stirring, then cooled to 120° F. (approx. 48.8° C.). The total insect slurry (approximately 22 pounds (approx. 9.9 kg)) was then sprayed dried to yield 1.80 pounds (approx. 0.8 kg) of insect powder with a 6.85% moisture content measured by an Ohaus Moisture balance.

Example 17

Preparation of Insect Product 40 pounds (approx. 18.1 kg) of whole frozen mealworms were ground through an Old Tyme Peanut Butter Ginder on the finest grind setting. Water was added to the mealworm slurry on a 1:1.2 weight basis and blended until smooth. The mealworm slurry was then passed through a 30 mesh screen to remove the larger particulates and then processed through an Acme juicer in small batches until approximately 25 pounds (approx. 11.3 kg) was collected. Approximately 10 pounds (approx. 4.5 kg) of the mealworm slurry was then pasteurized by heating to 175° F. (approx. 79.4° C.) in a water bath set up and held at 175° F. (approx. 79.4° C.) for 10 minutes with constant stirring, then cooled to 120° F. (approx. 48.8° C.). The remaining mealworm slurry (approximately 15 pounds (approx. 6.8 kg)) was then pasteurized by heating to 160° F. (approx. 71.1° C.) in a water bath set up and held at 160° F. (approx. 71.1° C.) for 10 minutes with constant stirring, then cooled to 120° F. The total mealworm slurry (approximately 25 pounds (approx. 11.3 kg)) was then sprayed dried to yield 3.80 pounds (approx. 1.7 kg) of insect powder with a 6.58% moisture content measured by an Ohaus Moisture balance.

Modifications and variations of the methods and products described herein will be obvious to those skilled in the art from the foregoing detailed description. Such modifications and variations are intended to come within the scope of the appended claims.

I claim:

1. A method for producing insect product, the method comprising:
    wet-grinding whole unwashed insects or whole unwashed adult insects into an insect slurry; and
    drying the insect slurry to form a dried insect product comprising solid insect matter particles,
    wherein the solid insect matter particles have a particle size of 5 mm or less;
    wherein the whole unwashed insects are superworms, crickets, mealworms, grasshoppers, locusts, katydids, caterpillars, or flies;
    wherein the solid insect matter particles are present in the dried insect product in an amount from about 85% to about 100% by weight of the dried insect product;
    wherein the dried insect product comprises protein in an amount of about 50% or more by weight based on dry weight of the composition;
    wherein the step of drying consists of one or more of heat drying, spray drying, or freeze drying; and
    wherein the method does not comprise a protein hydrolysis step.

2. The method of claim 1, wherein about 90% of the solid insect matter particles, by volume, has a particle size of from about 1 μm to about 1000 μm, and
    wherein the dried insect product has a water activity of about 0.5 aw or less.

3. The method of claim 1, wherein about 90/o of the solid insect matter particles, by volume, has a particle size of about 100 μm or less.

4. The method of claim 1, further comprising milling the solid insect matter particles of the dried insect product.

5. The method of claim 4, wherein about 90% of the milled solid insect matter particles, by volume, has a particle size of about 100 μm or less.

6. The method of claim 1, further comprising filtering the dried insect product.

7. The method of claim 6, further comprising preserving the dried insect product prior to the step of filtering.

8. The method of claim 6, further comprising preserving the dried insect product after the step of filtering.

9. The method of claim 1, further comprising removing insect chitin from at least a portion of the insect slurry prior to the step of drying.

10. The method of claim 9, further comprising preserving the insect slurry prior to the step of removing the insect chitin.

11. The method of claim 9, further comprising preserving the insect slurry between the step of removing the insect chitin and the step of drying.

12. The method of claim 1, further comprising removing insect chitin from at least a portion of the dried insect product.

13. The method of claim 1, further comprising preserving the insect slurry prior to the step of drying.

14. The method of claim 13, further comprising reconstituting the dried insect product into a liquid form to produce a liquid insect product.

15. The method of claim 13, wherein the step of preserving comprises pasteurizing, sterilization, acidification, pressure, vacuum, cooking, heat treating, low heat storage, pickling, blanching, steaming, boiling, or a combination thereof.

16. The method of claim 13, wherein the step of wet-grinding comprises two separate grinding steps, wherein the first grinding step is a coarse wet-grinding and the second grinding step is a fine wet-grinding.

17. The method of claim 16, wherein the step of preserving the insect slurry occurs between the coarse wet-grinding and the fine wet-grinding.

18. The method of claim 17, further comprising reconstituting the dried insect product into a liquid form to produce a liquid insect product.

19. The method of claim 1, further comprising preserving the dried insect product.

20. The method of claim 19, wherein the step of preserving comprises pasteurizing, sterilization, acidification, pressure, vacuum, cooking, heat treating, low heat storage, pickling, blanching, steaming, boiling, or a combination thereof.

21. The method of claim 1, further comprising two separate preservation steps, wherein at least one preservation step occurs between the step of wet-grinding and the step of drying.

22. The method of claim 1, wherein the step of wet-grinding comprises two separate grinding steps, wherein the first grinding step is a coarse wet-grinding and the second grinding step is a fine wet-grinding.

23. The method of claim 22, further comprising two separate preservation steps, wherein at least one preservation step occurs prior to the step of drying.

24. The method of claim 22, further comprising reconstituting the dried insect product into a liquid form to produce a liquid insect product.

25. The method of claim 22, further comprising two separate preservation steps, wherein at least one preservation step occurs between the coarse wet-grinding and the fine wet-grinding.

26. The method of claim 1, further comprising euthanizing the whole unwashed insects, or the whole unwashed adult insects prior to the step of wet-grinding.

27. The method of claim 26, wherein the step of euthanizing comprises freezing, fumigating, soaking in liquid, smashing, suffocating with $CO_2$ or $N_2$ atmosphere, applying electric current, heating, or cooking the whole unwashed insects or the whole unwashed adult insects.

28. The method of claim 1, wherein the whole unwashed insects or the whole unwashed adult insects are Caribbean fruit flies or black soldier flies.

29. The method of claim 1, further comprising reconstituting the dried insect product into a liquid form to produce a liquid insect product.

30. The method of claim 29, further comprising processing the liquid insect product into the form of a paste or a solid.

* * * * *